US008522220B2

(12) United States Patent
Shih-wei Liao et al.

(10) Patent No.: US 8,522,220 B2
(45) Date of Patent: Aug. 27, 2013

(54) POST-PASS BINARY ADAPTATION FOR SOFTWARE-BASED SPECULATIVE PRECOMPUTATION

(75) Inventors: Steve Shih-wei Liao, Palo Alto, CA (US); Perry H. Wang, San Jose, CA (US); Hong Wang, Fremont, CA (US); Geolf F. Hoflehner, Santa Clara, CA (US); Daniel M. Lavery, Santa Clara, CA (US); John P. Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 543 days.

(21) Appl. No.: 12/658,031

(22) Filed: Feb. 1, 2010

(65) Prior Publication Data

US 2010/0211940 A1 Aug. 19, 2010

Related U.S. Application Data

(63) Continuation of application No. 10/245,548, filed on Sep. 17, 2002, now Pat. No. 8,095,920.

(51) Int. Cl.
*G06F 9/45* (2006.01)

(52) U.S. Cl.
USPC .......................................... 717/146; 717/140

(58) Field of Classification Search
USPC .................................. 717/140, 146
See application file for complete search history.

(56) References Cited

PUBLICATIONS

Collins et al., "Speculative Precomputation: Long-range Prefetching of Delinquent Loads", In Proceedings of the 28th International Symposium on Computer Architecutre, Jul. 2001.*
Collins et al., "Dynamic Speculative Precomputation", In Proceedings of the 34th International Symposium on Computer Architecutre, Dec. 2001.*

* cited by examiner

*Primary Examiner* — Wei Zhen
*Assistant Examiner* — Lanny Ung
(74) *Attorney, Agent, or Firm* — Shireen Irani Bacon

(57) ABSTRACT

The latencies associated with cache misses or other long-latency instructions in a main thread are decreased through the use of a simultaneous helper thread. The helper thread is a speculative prefetch thread to perform a memory prefetch for the main thread. The instructions for the helper thread are dynamically incorporated into the main thread binary during post-pass operation of a compiler.

14 Claims, 13 Drawing Sheets

```
        do {
A:       t = arc;
         . . .
         . . .
         . . .
B:       u = load(t->tail);
C:       load(u->potential);
         . . .
         . . .
D:       arc = t + nr_group;
E:      } while (arc < K);
```

Code from
Main Thread load(u->potential) is delinquent

```
        do {
A:       t = arc;
B:       u = load(t->tail);
C:       prefetch(u->potential);
D:       arc = t + nr_group;
E:      } while (arc < K);
```

Execution slice
("p-slice")

POST-PASS BINARY ADAPTATION FOR SOFTWARE-BASED SPECULATIVE PRECOMPUTATION

RELATED APPLICATION

This application is a Continuation of U.S. patent application Ser. No. 10/245,548, entitled "Post-Pass Binary Adaptation For Software-Based Speculative Precomputation," filed on Sep. 17, 2002. This application is entirely incorporated by reference.

BACKGROUND

1. Technical Field

The present invention relates generally to information processing systems and, more specifically, to dynamically adapting a binary file to facilitate speculative precomputation.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, super-scalar execution, out-of-order execution, and caches. Many such approaches have led to increased transistor count, and have even, in some instances, resulted in transistor count increasing at a rate greater than the rate of improved performance.

Rather than seek to increase performance through additional transistors, other performance enhancements involve software techniques. One software approach that has been employed to improve processor performance is known as "threading." In software threading, an instruction stream is split into multiple instruction streams that can be executed in parallel. In one approach, multiple processors in a multi-processor system may each act on one of the multiple threads simultaneously.

In another approach, known as time-slice multi-threading, a single processor switches between threads after a fixed period of time. In still another approach, a single processor switches between threads upon occurrence of a trigger event, such as a long latency cache miss. The latter approach is known as switch-on-event multithreading. While achieving performance gains in certain circumstances, these approaches do not achieve optimal overlap of many sources of inefficient resource usage, such as branch mispredictions and instruction dependencies.

In a quest for further performance improvements, the concept of multi-threading has been enhanced in a software technique called simultaneous multi-threading ("SMT"). In SMT, multiple threads can execute simultaneously on a single processor without switching. In this approach, a single physical processor is made to appear as multiple logical processors to operating systems and user programs. That is, each logical processor maintains a complete set of the architecture state, but nearly all other resources of the physical processor, such as caches, execution units, branch predictors, control logic and buses are shared. The threads execute simultaneously and make better use of shared resources than time-slice multi-threading or switch-on-event multithreading. Nonetheless, there is still a performance penalty to be paid on a cache miss, or other long latency operation, that occurs during execution of the threads.

Embodiments of the method and apparatus disclosed herein address this and other concerns related to latencies and multi-threading.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method and apparatus for dynamic post-pass binary adaptation for software-based speculative precomputation.

FIG. 4, including

DETAILED DISCUSSION

Figure 1:
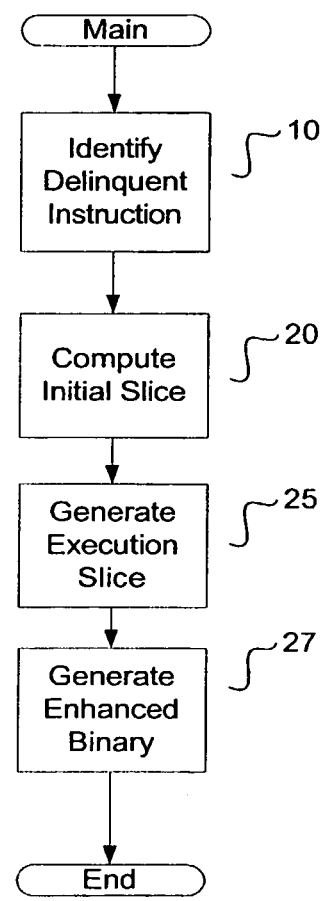
FIG. 1 is a flowchart illustrating at least one embodiment of dynamic binary adaptation for software-based speculative precomputation.

FIG. 1 is a flowchart illustrating at least one embodiment of a method 100 for dynamically adapting a binary file to perform software-based speculative precomputation. The word "dynamically" is used herein to refer to an automated process. Such automated processes are in contrast, for instance, to methods that utilize hand-inserted code to facilitate speculative precomputation and to methods that utilize manually-constructed chaining execution slices. For at least one embodiment of the method 100, the latency associated with cache misses in a main thread is decreased through the use of a simultaneous helper thread. The helper thread is a speculative prefetch thread to perform a memory prefetch for the main thread. For at least one embodiment, the helper thread is an SMT thread that is executed by a second logical processor on the same physical processor as the main thread. One skilled in the art will recognize that the method 100 may be utilized in any multi-threading approach, including SMT, multi-processor multi-threading, or any other known multi-threading approach.

Figure 12:
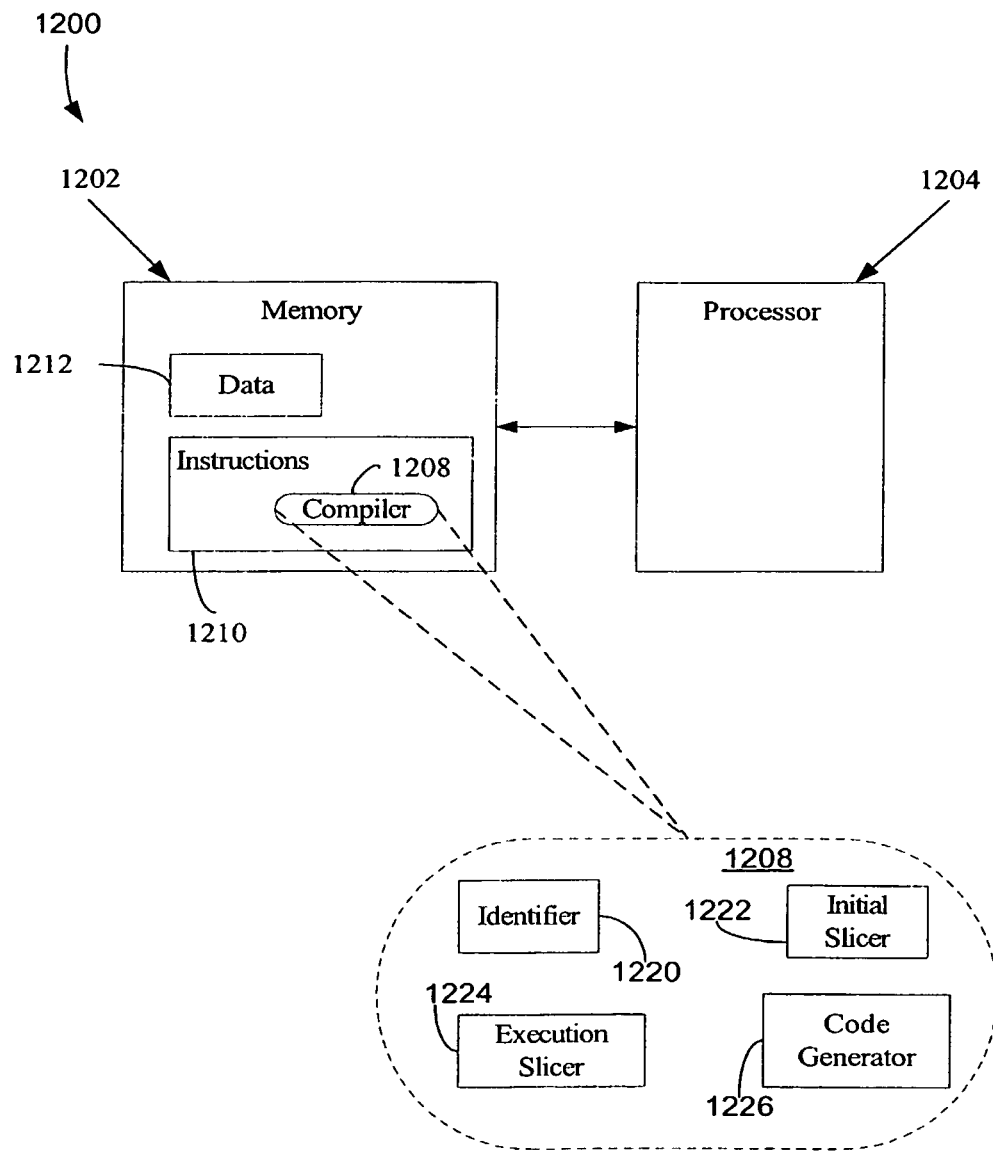
FIG. 12 is a block diagram of a processing system capable of performing at least one embodiment of dynamic binary enhancement for software-based speculative precomputation.

Traditional software program parallelization techniques do not perform well for irregular or non-numerical applications such as those that require accesses to memory based on linked list structures. In such cases, the memory location to be accessed (for instance, by a load instruction) cannot be easily predicted by traditional approaches. The method 100 illustrated in FIG. 1 utilizes the software program itself to predict the address for a memory fetch. For at least one embodiment, method 100 is performed by a compiler 1208 (FIG. 12). In such embodiment, the method 100 represents an automated process in which a compiler dynamically identifies a spawn point for a helper thread and dynamically generates the helper thread, embedding a trigger at the spawn point in the binary of the main thread. The helper thread is dynamically incorporated (such as, for example, by appending) into the binary file during a post-compilation pass of the compiler. For at least one embodiment, the helper thread represents a subset of the instructions from the IR of the software program under compilation (referred to herein as the "main thread"). The subset of instructions in the helper thread are such that the helper thread contains a reduced set of instructions to compute the address of a future memory access in the main thread. The helper thread computes the address of the data required by the main thread and fetches the address from memory (or a higher-level cache) into a lower memory level in time to prevent a cache miss in the main thread. As the following discussion makes clear, it is sometimes desirable to optimize the helper thread in order provide enough slack to allow the helper thread to execute in time to prevent a cache miss in the main thread. This optimization may take the form of additional helper threads in an approach referred to herein as "chained speculative precomputation" or "chained SP."

FIG. 1 illustrates that the method 100 identifies 10 a delinquent instruction. A delinquent instruction is an instruction that is likely to miss in the cache during run-time, the delinquent instruction being contained within a loop structure. The method then computes 20 an initial slice for the delinquent instruction. In order to properly schedule the slice, one or more execution slices are then generated 25. The execution slice(s) are incorporated into a binary, file, as is a trigger to cause the execution slice(s) to be executed, when an enhanced binary is generated 27. Each of blocks 10 (identifying delinquent instruction), 20 (computing initial slice), 25 (generating execution slice) and 27 (generating enhanced binary) are discussed in further detail below in connection with FIGS. 5, 6, 7 and 8, respectively.

Figure 2:
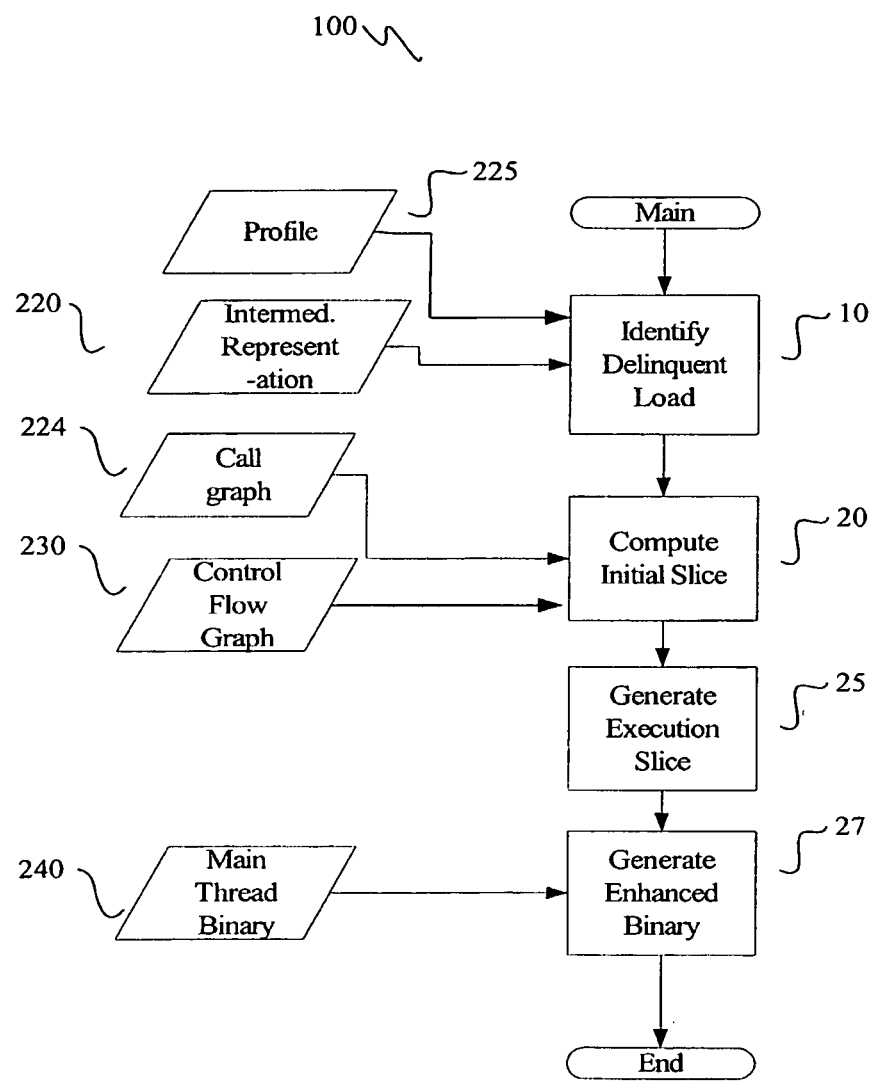
FIG. 2 is a data flow diagram showing at least one embodiment of a set of inputs for a software-based method of dynamic binary adaptation for speculative precomputation.

FIG. 2 illustrates that, for at least one embodiment of the method 100 illustrated in FIG. 1, certain data is consulted during execution of the method 100. FIG. 2 illustrates that an intermediate representation 220 ("IR") and profile 225 are accessed to aid in identification 10 of a delinquent instruction. Also, a control flow graph 230 ("CFG") and call graph 224 are accessed to aid in computation 20 of the initial slice for a delinquent instruction.

Figure 3:
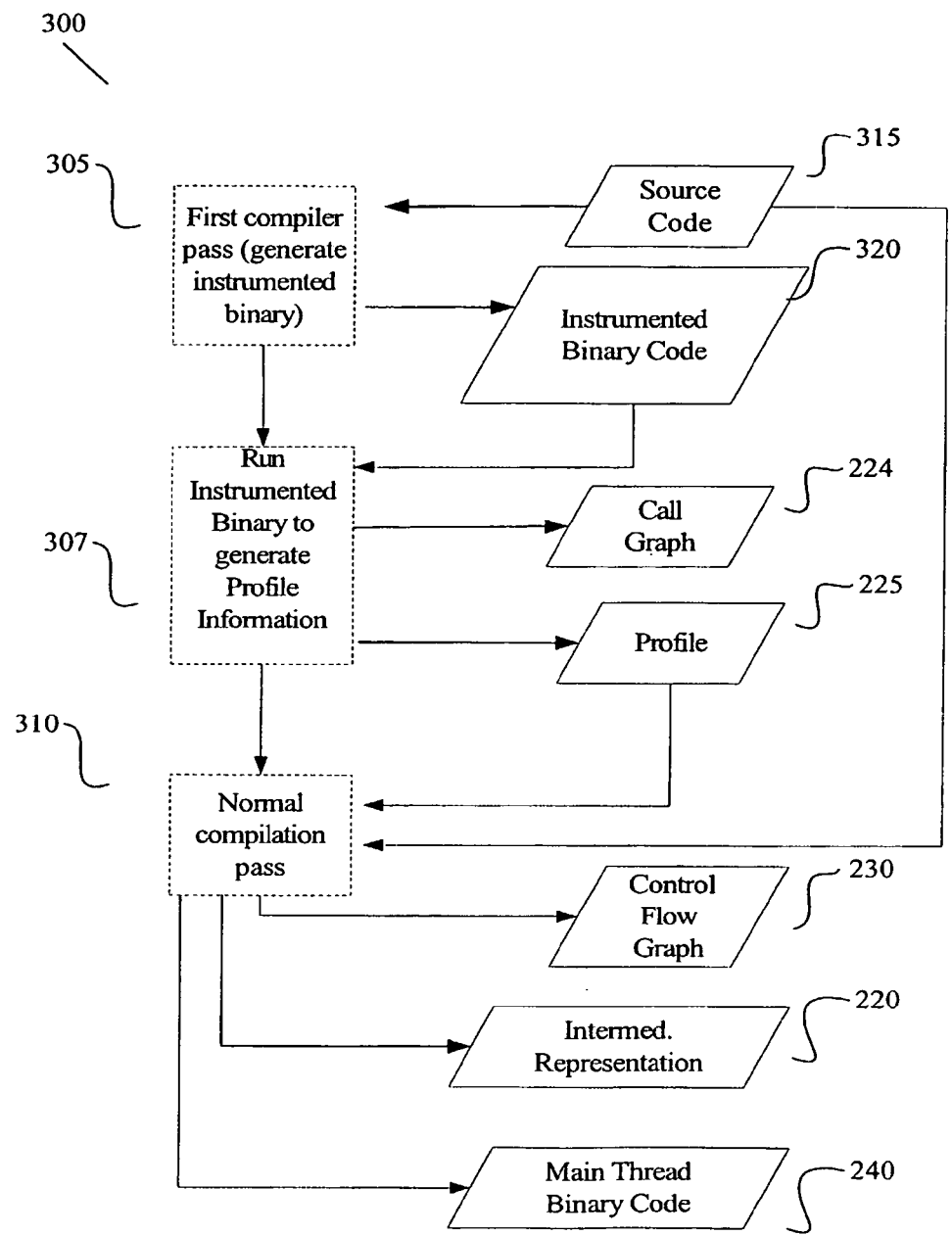
FIG. 3 is a flowchart illustrating at least one embodiment of a software compilation process.

FIG. 3 illustrates that the CFG 230, IR 220, profile 225 and call graph 224 are typically generated by one or more compilation passes 305, 310 prior to execution of the method 100. In FIG. 3, a typical compilation process 300 is represented. The process 300 involves two compiler-performed passes 305, 310 and also involves a test run 307 that is typically initiated by a user, such as a software programmer. During a first pass 305, the compiler 1208 (FIG. 12) receives as an input the source code 315 for which compilation is desired. The compiler then generates instrumented binary code 320 that corresponds to the source code 315. The instrumented binary code 320 contains, in addition to the binary for the source code 315 instructions, extra binary code that causes, during a run of the instrumented code 320, statistics to be collected and recorded in a profile 225 and a call graph 224. When a user initiates a test run 307 of the instrumented binary code 320, the profile 225 and call graph 224 are generated. During the normal compilation pass 310, the profile 225 is used as an input into the compiler. Such profile 225 may be used, for example, by the compiler during the normal compilation pass 310 to aid with performance enhancements such as speculative branch prediction. With the profile 225 as an input, as well as the original source code 215, the compiler generates, during the normal compilation pass 310, a control flow graph (CFG) 230 and an intermediate representation (IR) 220 as well as the binary code 240 for the source code 315.

Each of the passes 305, 310, and the test run 307, are optional to the method 100 depicted in FIG. 1 in that any method of generating the information represented by call graph 224, profile 225, CFG 230, IR 220 and binary code 240 may be utilized. Accordingly, first pass 305 and normal pass 310, as well as test run 307, are depicted with broken lines in FIG. 3 to indicate their optional nature. One skilled in the art will recognize that any method of generating the information represented by profile 225, CFG 230, IR 220, binary code 240 and call graph 324 may be utilized, and that the actions 305, 307, 310 depicted in FIG. 3 are provided for illustrative purposes only.

Figure 5:
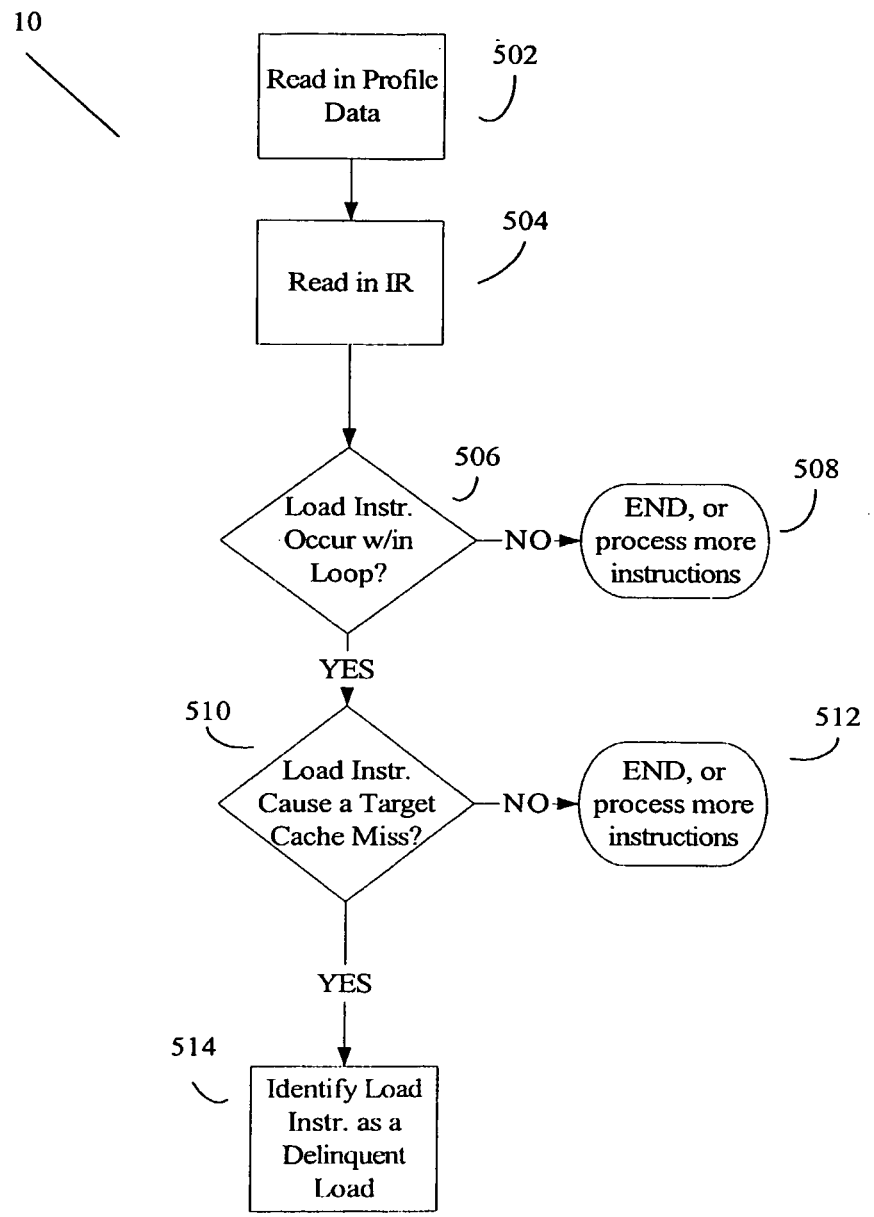
FIG. 5 is a flowchart illustrating at least one embodiment of a method for identifying a delinquent load.

FIG. 5 illustrates identification 10 of a delinquent instruction. FIG. 5 illustrates that profile 225 (FIG. 2) and IR 220 (FIG. 2) are accessed at blocks 502 and 504, respectively. Using such information, load instructions are identified, and it is determined 506 whether a particular load instruction occurs within a loop. If the load instruction does not occur within a loop, then it is not a candidate for software-based speculative precomputation and processing for the load instruction terminates 508. If the identified load instruction does occur within a loop, then processing continues at block 510. At block 510, it is determined whether the load instruction is likely to cause a cache miss. This information can be obtained, for example, from the profile 225 (FIG. 2) or from hardware counters that keep track of cache misses during the test run 307 (FIG. 3). At block 510, load instructions that are likely to cause a cache miss are further processed to determine whether they will cause a "target" cache miss. A target cache miss is an anticipated cache miss that is expected to occur due to execution of one of the load instructions in a target set of load instructions. The target set of load instructions is the smallest set of load instructions that result in at least a predetermined percentage of the cache misses anticipated during a run of the main thread. For instance, in an embodiment where the predetermined percentage is 90%, the target load instructions are those load instructions that contributed to at least 90% of the cache misses recorded during the test run 307 (FIG. 3). If a load instruction is not identified at block 510 as being in the target set of load instructions, then it is not a candidate for software-based speculative precomputation, and processing for the instruction ends at block 512. Otherwise, the load instruction is identified as a delinquent load instruction at block 514. This manner of identifying 10 a delinquent load instruction is based on the observation that, for many software programs, only a small number of static load instructions are responsible for a large majority of cache misses during execution. The method 100 thus utilizes profile-guided compilation to identify the target delinquent loads, which represent pre-fetch opportunities.

Figure 6:
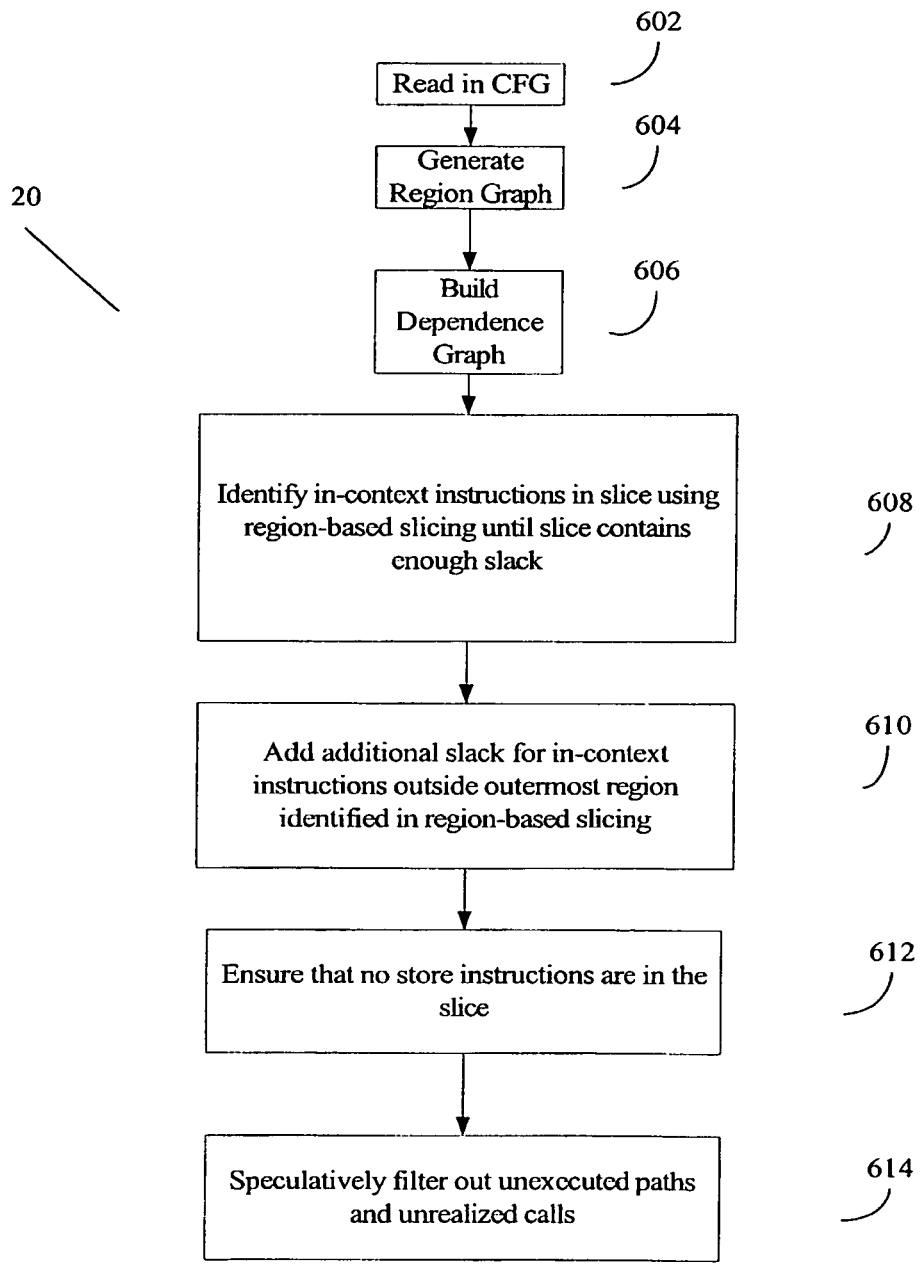
FIG. 6 is a flowchart illustrating at least one embodiment of a method for computing an initial slice.
Figure 9:
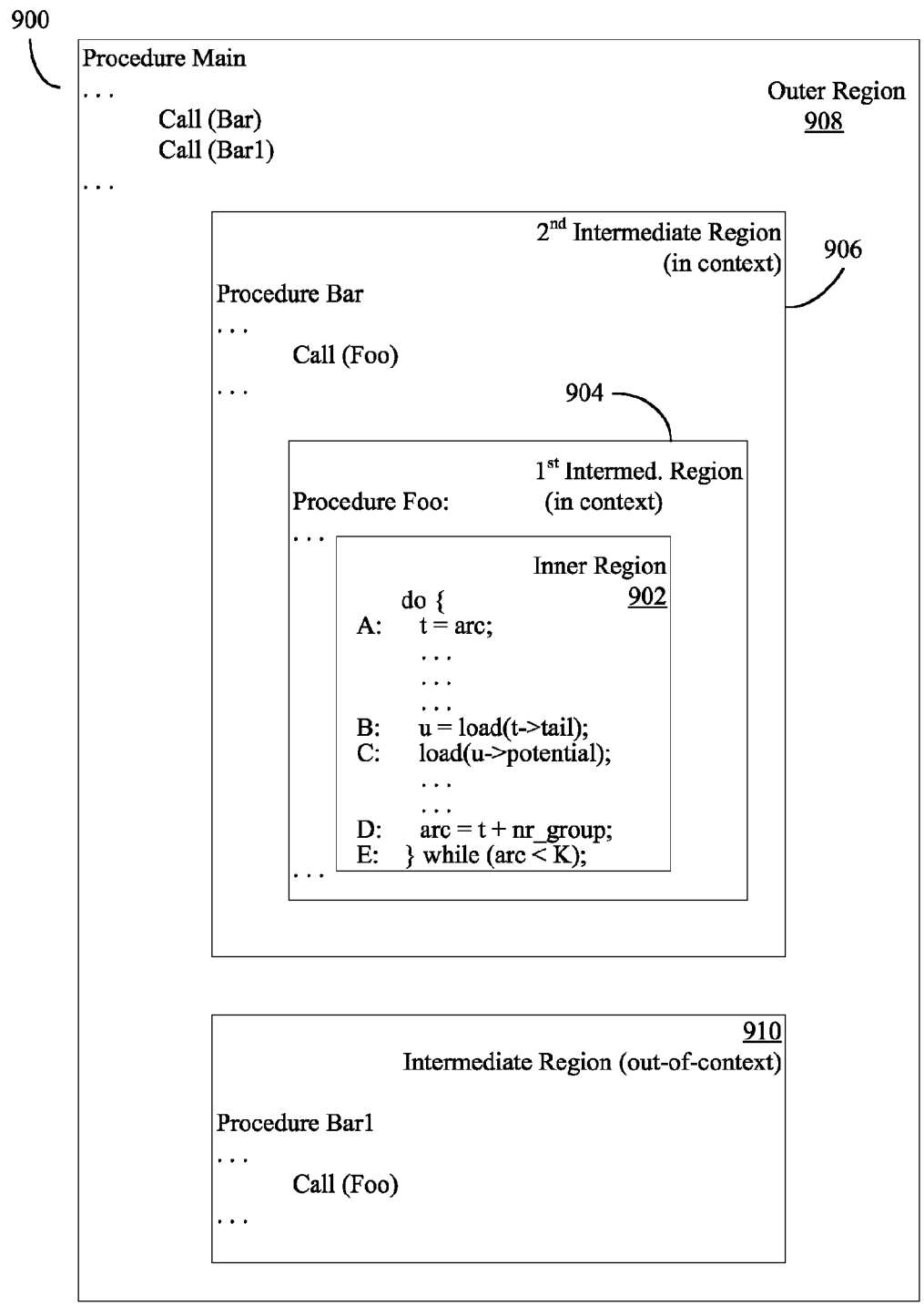
FIG. 9 is a block diagram illustrating regions for a delinquent load instruction, according to an embodiment of the invention

FIGS. 4, 6 and 9 are relevant to a discussion of computation 20 of an initial slice for a delinquent instruction. FIG. 6 is a flowchart illustrating the computation 20 of an initial slice for a delinquent instruction as identified at block 10. Generally, the slice is computed 20 to contain only those instructions from the main thread that are necessary to compute the memory address to be fetched by the delinquent load instruction.

Figure 4A:
FIG. 4A, FIG. 4B, and FIG. 4C, illustrates a binary code excerpt (FIG. 4A), execution slice (FIG. 4B) and dependence diagram (FIG. 4C) for a sample delinquent load instruction.
Figure 4B:
Figure 4C:
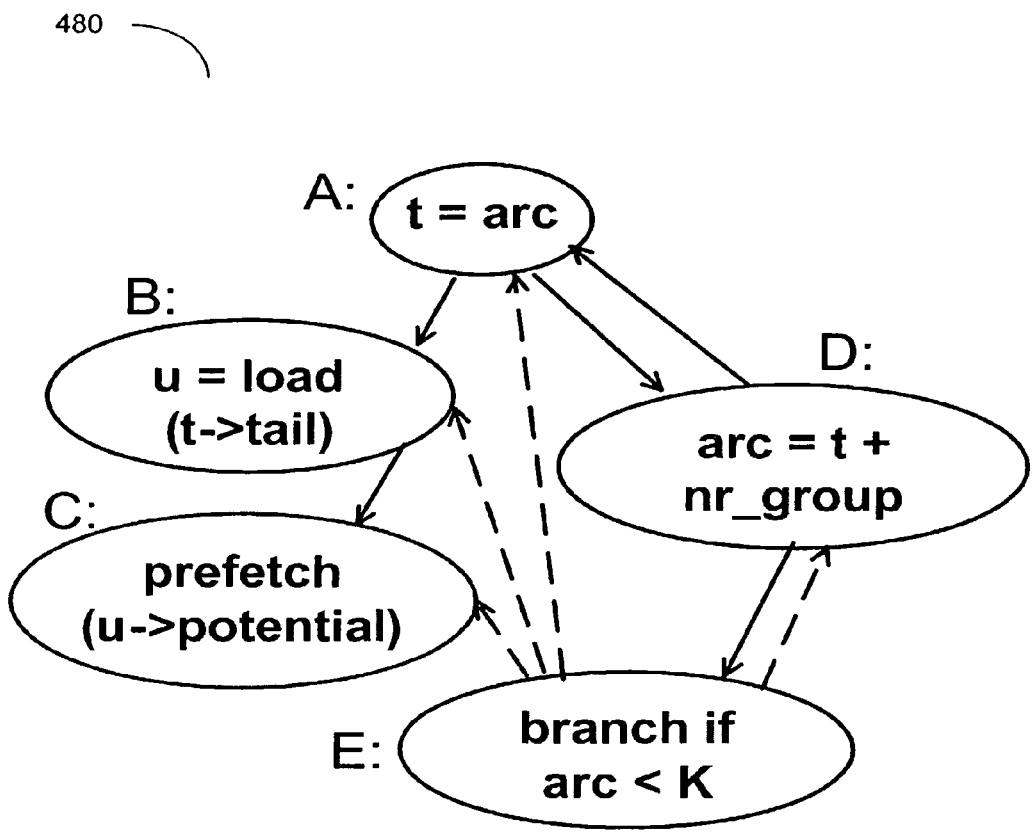

FIG. 6 will be discussed, for clarity, in conjunction with an example illustrated in FIGS. 4 and 9. FIG. 4A illustrates a sample main thread binary code excerpt 400 for a sample delinquent load instruction and FIG. 4C illustrates the dependence diagram 480 of the slice for the instruction. FIG. 9 is a block diagram illustrating a sample region hierarchy for the code excerpt of FIG. 4A.

A slice, as computed 20 by the method 100, is the set of instructions that contribute to the computation of the memory address to be accessed by the delinquent load. The slice is used to generate a helper thread capable of speculatively prefetching the load data in order to avoid a cache miss in the main thread. The slice therefore is a subset of instructions from the main thread. It should be noted that, while the method 100 may be used, and is discussed herein primarily in connection with, load instructions, the usefulness of the method is not limited to load instructions. The method 100 may be used to generate a helper thread for any long-latency instruction.

Various slicing approaches may be used to determine which instructions from the main thread should be included in the slice for the delinquent load instruction. A slice that contains too little slack will result in a cache miss before the helper thread completes its prefetch, while a slice that contains too much slack may result in early eviction of the prefetched data. Slack is the execution distance, measured, e.g., in terms of machine cycles, between execution of the prefetch instruction in the helper thread and execution of the delinquent load instruction in the main thread. For at least one embodiment of the method 100, slack for a prefetch in a helper thread is more specifically defined as:

Slack(load,prefetch)=timestamp$_{main}$(load)−timestamp$_{spec}$(prefetch), where timestamp$_{main}$ (load) and timestamp$_{spec}$ (prefetch) denote the time when the delinquent load instruction is executed in the main thread and when the prefetch is executed in the speculative thread, respectively. With sufficient slack, the prefetch of the helper thread may execute during the slack period and place the desired data in the cache before the main thread attempts to fetch the data, avoiding a cache miss. Too much slack, however, might result in the prefetched data being evicted from the cache before its access by the main thread.

For one common slicing approach, all of the control and data dependence edges originating from the load instruction being sliced are transitively followed. Such common approach may result in undesirably large slices. In contrast, region-based slicing is an incremental slicing approach that allows the method 100 to incrementally increase the slack value from one code region to another, moving from inner region to outer region. The incremental approach of region-based slicing allows the slack in a slice to be increased until the slice has enough slack to avoid cache misses in the main thread, but does not have so much slack as to risk an early cache eviction.

FIGS. 6 and 9 illustrate region-based slicing, which is performed at block 608. In region-based slicing, a region represents a loop structure, a procedure, or a loop body. Using information from the CFG 15 accessed at block 602, the method 100 generates 604 a region graph. A region graph is a hierarchical program representation that uses edges to connect a parent region to its child regions. That is, callers are connected to callees, and edges are connected between outer scope and inner scope.

FIG. 9 shows a simplified diagram of a region hierarchy 900 that might be represented in a region graph. FIG. 9 illustrates, for example, a delinquent load instruction, denoted as instruction C, that falls within a loop. The loop represents the innermost region 902 for the delinquent load instruction, C. It should be noted that, as discussed above, only those load instructions that occur within a loop structure are identified at block 10 (FIG. 1) to be a delinquent load instruction.

The loop, in turn, is called within procedure Foo. Procedure Foo represents an intermediate region 904 for the delinquent load instruction, C. Procedure Foo, in turn, is called by Procedure Bar. Procedure Bar, therefore, represents another intermediate region 906 for the delinquent load instruction, C. Procedure Bar, in turn, is called by Main. Main represents the outer region 908 for the delinquent load instruction, C. It should be noted that, because Foo is also called by Procedure Bar 1, which is also called by Main, Procedure Bar 1 also represents an intermediate region 910 for the delinquent load instruction, C. However, since the delinquent load instruction, C, has been identified within the context of Procedure Bar, intermediate region 910 is an out-of-context region for the delinquent load instruction, C.

Returning to FIG. 6, it can be seen that the method 100 also builds 606 a dependence graph that contains both control and data dependence edges. FIG. 4C illustrates a representation 480 of a dependence graph. For purposes of illustration, the dependence graph 480 illustrates the graph that might be built 606 for the delinquent load instruction, C, from the main thread code excerpt 400 illustrated in FIG. 4A. That is, FIG. 4C illustrates a dependence diagram 480 showing the dependence edges associated with the delinquent load instruction, C. The slice represented by the dependence diagram 480 is used to generate a number of prefetch iterations, one for each iteration of the loop 902 (FIG. 9) in the main thread. Accordingly, the load instruction, C, from the main thread code excerpt 400 is represented by a prefetch instruction, C, in the slice shown in FIG. 4C. In FIG. 4C, the prefetch for the delinquent load instruction is denoted as instruction C, the solid arrows represent data dependence edges, and the dotted arrows represent control dependence edges.

For the delinquent load instruction previously identified (see block 10 in FIG. 1), the method 100 identifies 608 the backward slice of the load address in the dependence graph 480, starting from the innermost region in which the delinquent load instruction occurs in the main thread. The method 100 traverses the dependence graph from inner region to outer region, identifying 608 the backward slice of the load address until the slack associated with the slice is large enough.

The previous discussion lends itself to a characterization that instructions from increasingly larger regions are added until enough slack exists in the slice. However, another characterization is also valid. That is, to generate the slice for a delinquent load instruction, unnecessary instructions are eliminated from the binary of the main thread until enough slack is realized. For example, the slice illustrated in FIGS. 4B and 4C does not include the instructions of the main thread that are represented by ellipses in FIG. 4A. If enough slack cannot be realized by eliminating instructions in the innermost region, then instructions are eliminated from increasingly outward regions until enough slack is realized.

While a region-based slicing approach helps avoid undesirably large slices, it can nonetheless include unrealizable paths. This drawback results from computing the slice as the union of all statements in the dependence graph from all in-region paths that reach the reference load instruction without matching in- and out-parameter bindings.

To address this imprecision concern, at least one embodiment of the method 100 utilizes a context-sensitive slicing approach to identify 608, 610 instructions in the slice for a delinquent load. In this manner, out-of-context instructions are not included in the slice computed 608 using the region-based slicing approach. In addition, at block 610, the slice is computed to include in-context instructions outside the outermost region identified as a result of the region-based slicing at block 608. Accordingly, a context-sensitive slice of a reference instruction r with respect to a calling context C is generated as:

$$\text{slice}(r, [c_1, \ldots, c_n]) = \text{slice}(r, \phi) \cup \bigcup_{f \in F} \text{slice}(\text{contextmap}(f, c_n), [c_1, \ldots, c_{n-1}])$$

Equ. 1

In Equ. 1, let $C=[c_1, \ldots c_n]$ be the call sites currently on a call stack (not shown) that is maintained during execution of the method 100, with $c_n$ being the one on the top of the call stack, and F be the subset of the formal parameters of the procedure upon which r depends. The function contextmap (f,c) returns the actual parameter passed to a formal variable fat call site c. Slice(r,$\phi$) represents the set of instructions found by transitively traversing the dependence edges backwards within the procedure in which r is located and its callees. In summary, the computation of a context-specific slice only builds the slice up the chain of calls on the call stack, which reduces the size of the slice. The method 100 also, in order to produce smaller slices, ignores loop-carried anti dependences and output dependences. At blocks 608 and 610, the context-sensitive slicing approach is applied in conjunction with region-based slicing in order to determine a context-sensitive slice for the delinquent load, where the slice has a desired amount of slack.

At block 612, the method 100 ensures that no store instructions are included in the slice. One skilled in the art will recognize that exclusion of store instructions need not occur temporally after the region-based and context-sensitive slicing, and can be performed in any order with respect to blocks 608 and 610.

FIGS. 2 and 6 illustrate that further slicing optimization is performed at block 614. At block 614, the method 100 performs control-flow speculative slicing to filter out unexecuted paths and unrealized calls. For at least one embodiment of slice computation 20, unexecuted paths and unrealized calls are predicted using the call graph 224. As explained above, at least one manner of generating a call graph 224 is to instrument all indirect procedural calls so that they are captured in the call graph 224 during a test run 307 (FIG. 3). During speculative slicing 614, unexecuted paths and unrealized calls, as predicted through use of the call graph 224, are filtered out of the initial slice.

While, for the sake of simplicity, the computation 20 of an initial slice has been discussed in connection with a single delinquent load instruction, the method 100 is not so limited. For instance, the computation 20 of slices may be performed, during a single post-pass iteration of the method 100, for each delinquent load instruction identified 10 as being part of the target set of load instructions.

Figure 7:
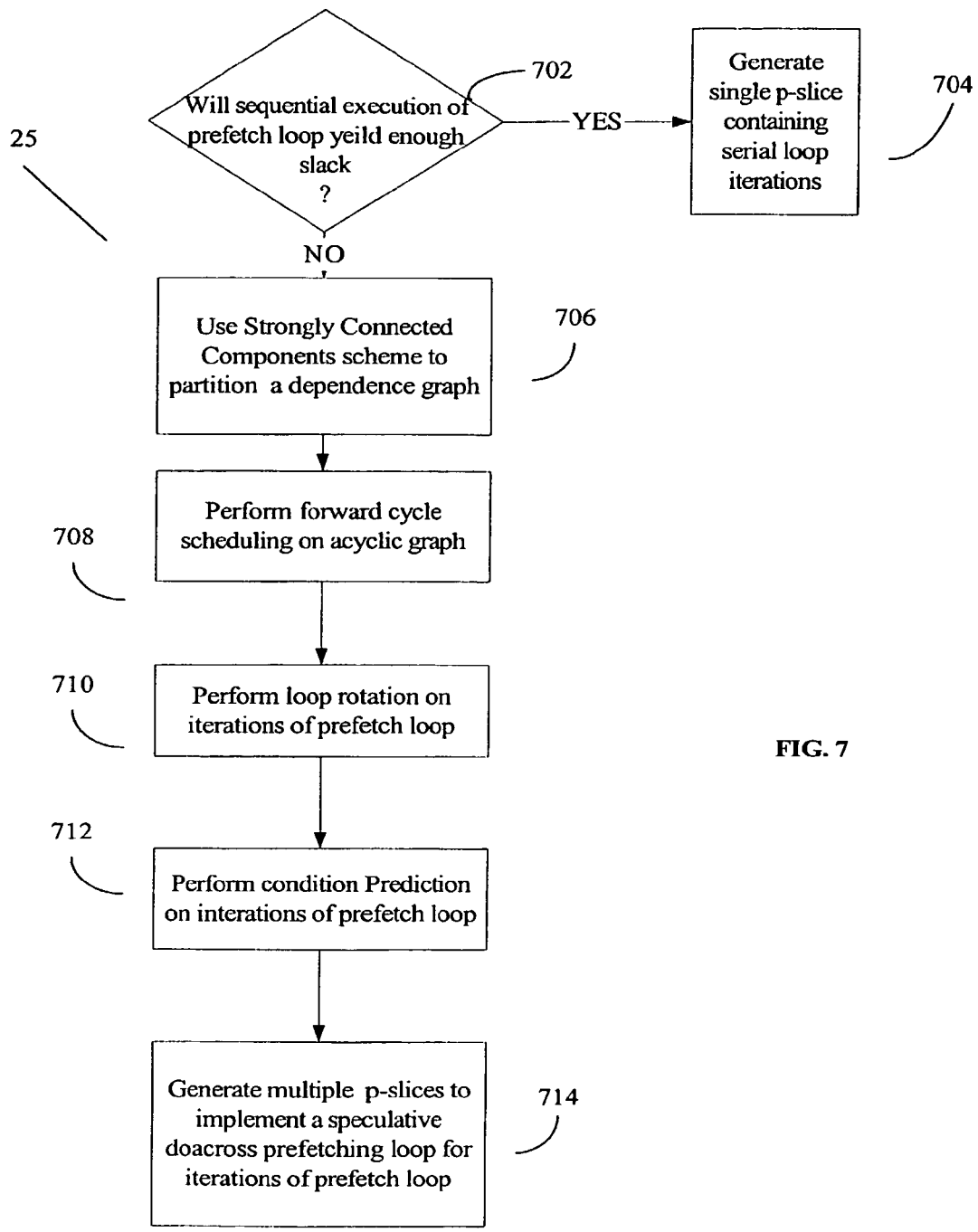
FIG. 7 is a flowchart illustrating at least one embodiment of a method for generating an execution slice.

FIGS. 4C and 7 illustrate generation 25 of an execution slice, also referred to herein as a precomputation slice ("p-slice"). FIG. 4C represents an initial slice for a load instruction, C, the slice being represented by a dependence graph 480. FIG. 4C shows that the instruction, C, occurs within a loop. Instructions in a pre-fetch loop may be iteratively executed to prefetch data for each iteration of the original loop in the main thread. In the case of the dependence graph 480 illustrated in FIG. 4C, instructions A, B, C and D are executed in multiple iterations until the value of the variable arc is not less than K.

Generation 25 of the execution slice ("p-slice") thus includes generation of multiple iterations of the instructions in the slice. Accordingly, generation 25 of the p-slice also involves a scheduling component to determine how to execute each iteration of the slice. When generating p-slice(s), scheduling considerations account for inter-thread communication in order to afford timely pre-execution of the p-slices in relation to the main thread. That is, it is beneficial to utilize otherwise idle hardware thread contexts to schedule timely prefetches that reduce cache miss latencies in the main thread.

FIG. 7 illustrates that at least two scheduling mechanisms for p-slice iterations may be considered. A first approach, referred to herein as basic speculative precomputation ("Basic SP"), generates 704 a single p-slice containing successive serial loop iterations of the slice instructions. A second approach, referred to herein as chaining speculative precomputation ("Chaining SP"), generates 714 multiple p-slices to execute the slice iterations. Each of the two scheduling approaches is discussed in further detail immediately below.

In the basic SP approach, a single p-slice is generated. For at least one embodiment, it is anticipated that the p-slice will be executed by a single prefetch thread. Accordingly, the p-slice generated 704 in the basic SP approach contains serial instructions for the successive slice iterations. FIG. 7 illustrates that the method 100 determines 702 whether basic SP is appropriate by evaluating whether sequential execution of the prefetch loop will yield enough slack to avoid cache misses in the main thread. If so, a single multiple-iteration slice is generated 704. Otherwise, chaining SP is performed at blocks 706 through 714.

Figure 10:
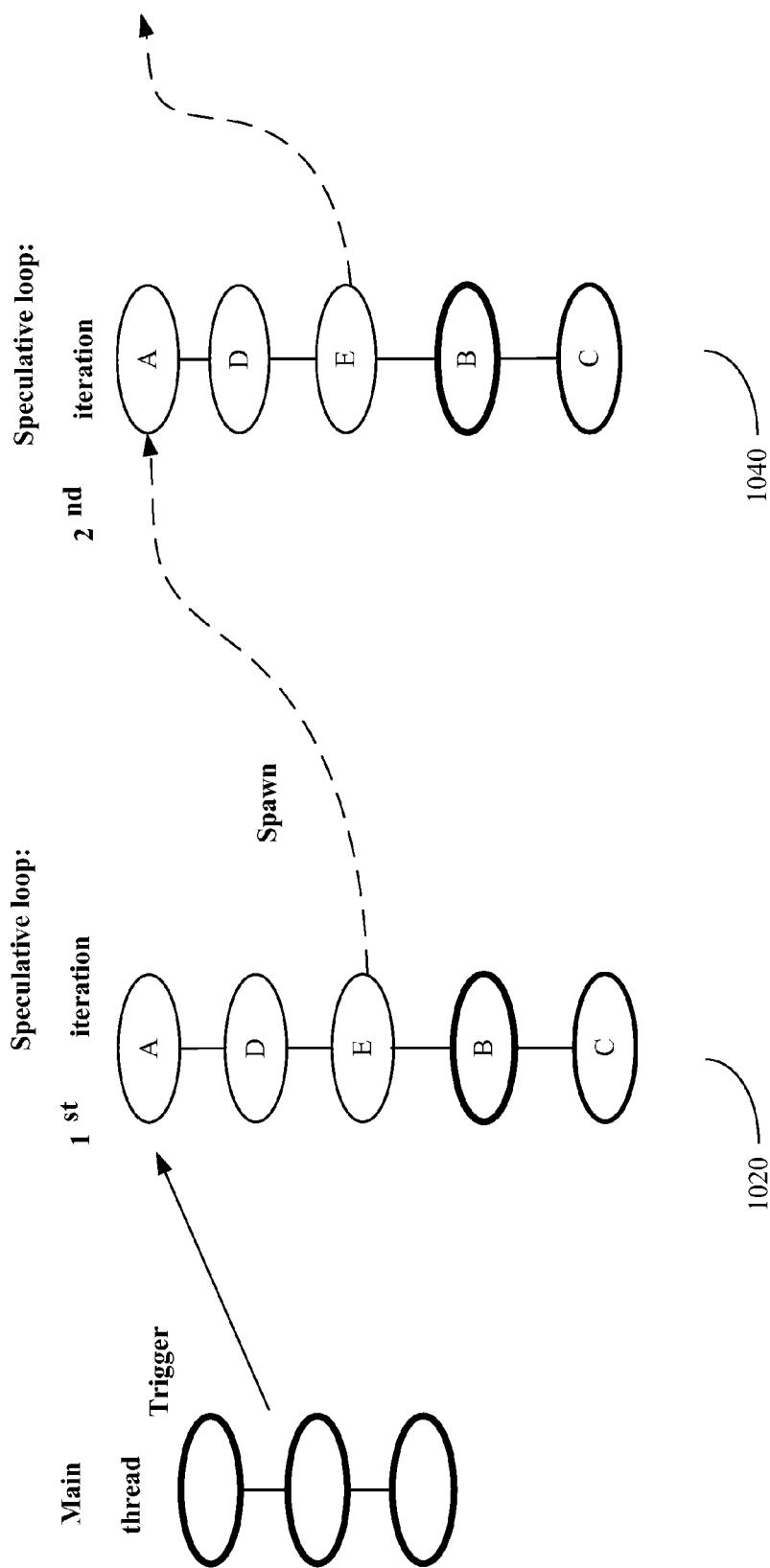
FIG. 10 is a block diagram illustrating chaining SP prefetch loop iterations according to an embodiment of the invention.
Figure 11:
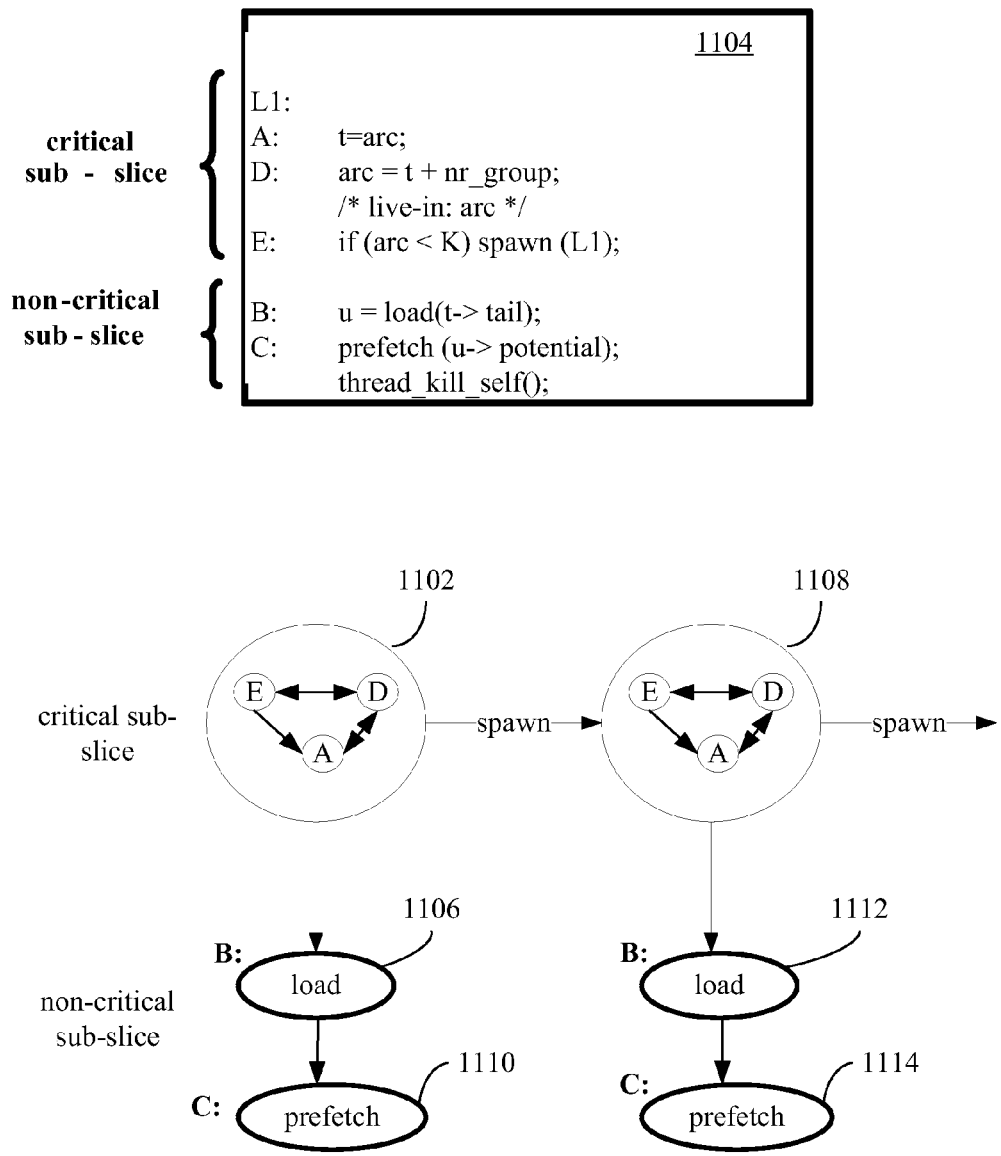
FIG. 11 is a block diagram illustrating the partitioning of chaining p-slices according to an embodiment of the invention.

FIGS. 7, 10 and 11 are relevant to a further discussion of Chaining SP. FIG. 10 illustrates multiple chained p-slices 1020, 1040. Chaining SP involves generating and scheduling chained p-slices 1020, 1040, which allows the stall penalty for successive prefetches to be paid, at least to some extent, at the same time. That is, there is at least some overlap of the stalls associated with memory prefetches in the chained threads 1020, 1040 of a do-across loop.

In generating and scheduling the chained threads of a do-across loop, it is efficient to schedule the chaining threads such that the next chained iteration is spawned only after the current p-slice has calculated the values that the next p-slice will need. Scheduling of chained speculative threads when generating 27 p-slices is thus facilitated by reducing the delays among the p-slices for a given set of dependences. Smaller delays result in larger slack values.

FIGS. 7 and 11 illustrate that at least one approach for achieving delay reduction between speculative p-slices is to partition 706 a dependence graph according to a "strongly connected components" ("SCC") scheme. In a strongly connected subgraph, there exists a path from any node to any other node in the subgraph. Furthermore, the SCC subgraph is defined as the maximal strongly connected subgraph in the dependence diagram. For instance, FIG. 11 shows the strongly connected components in the dependence graph 480 (FIG. 4C) for a sample slice. FIG. 11 shows that instructions A, D, and E from the dependence graph 480 (FIG. 4C) are merged into a single SCC node 1102, 1108. The arrows in FIG. 11 represent dependence edges. Accordingly, one can see from FIG. 11 that SCC portioning tightens cycles on the dependence graph. The single instruction nodes 1106, 1110, 1112, and 1114 are referred to as degenerate SCC nodes. In FIG. 11, instructions B and C represent degenerate SCC nodes 1106, 1110, 1112, 1114 because they are not part of a dependence cycle.

The occurrence of a non-degenerate SCC node, such as node 1102, in the dependence graph 480 (FIG. 4C), indicates the existence of one or more dependence cycles, which implies the existence of loop-carried dependences. For a loop-carried dependence, a later iteration of the loop relies upon a value, called a live-in value, determined by a prior iteration of the loop. (In contrast, a degenerate SCC node does not compute live-in values for the next chaining thread.)

FIGS. 10 and 11 illustrate the placement of spawning triggers for chained p-slices in order to schedule the judicious resolution of loop-carried dependences. A speculative thread executing a prefetch loop iteration (such as those 1020, 1040 illustrated in FIG. 10), resolves the loop-carried dependence in a dependence cycle before the next chaining thread is allowed to start executing the same dependence cycle in the next speculative pre-fetch iteration. This scheduling constraint is imposed by appropriate embedding of spawning triggers in the chained p-slices. Embedding of spawning triggers is discussed in further detail below in connection with FIG. 8.

FIG. 11 illustrates that the instructions in a non-degenerate SSC node 1102 therefore constitute instructions of the slice that are critical in the sense that they are performed before the next chaining slice is spawned in order to resolve loop-carried dependences. Similarly, degenerate SCC nodes, such as instructions B and C, are not critical in that they do not calculate live-in values for later iterations of the loop, and may therefore be executed concurrently with the later iterations. Certain dependence reduction techniques 710, 712, discussed below, help to further push computation into non-critical sub-slices.

Turning to FIGS. 7, 10 and 11 for a further discussion of scheduling for p-slices, it is apparent that forward cycle scheduling is performed at block 708. For at least one embodiment, the partitioned graph generated as a result of partitioning at block 706 is a directed acyclic graph ("DAG"). That is, there is no path from any SCC node back to itself. For example, FIG. 11 illustrates that, as long as spawning occurs after the instructions within a non-degenerate SCC node 1102, instruction D depends on the value calculated by instruction A in the previous iteration. As one skilled in the art is aware, a DAG may be scheduled according to a list scheduling algorithm. For at least one embodiment, the DAG generated as a result of the partitioning at block 706 is scheduled 708 according to a forward cycle scheduling approach with maximum cumulative cost heuristics. As the heuristics accumulates the cost, or latency for each path, the node with longer latency to the leaf nodes of the slice is given a higher priority. If two nodes have the same cost, the node with the lower instruction address in the original binary of the main thread is give a higher priority. Finally, the instructions within each non-degenerate SCC are list scheduled by ignoring the loop-carried dependence edges. The resulting binary code 1104 for a chaining p-slice for the example shown in FIG. 4 is illustrated in FIG. 11.

Many do-across loops may contain loop-carried dependences. In scheduling the chained speculative threads 1020, 1040, the method 100 takes the synchronization between threads into account by reducing the number of such dependences. FIG. 7 illustrates that two dependence reduction operations 710, 712 are performed. In the first such operation 710, loop rotation is performed on the iterations of the prefetch loop. In the second dependence reduction operation 712, condition prediction is performed on the iterations of the prefetch loop. Each dependence reduction operation 710, 712 is discussed in further detail below.

At block 710, loop rotation is performed on the iterations of the prefetch loop. Loop rotation reduces loop-carried dependence from the bottom of the slice in one iteration to the top of the slice in the next iteration. The reordering of the code for the p-slice does not affect the main thread, since the speculative thread executes different binary code than the main thread executes. Loop rotation 710 discerns a new loop boundary that converts backward loop-carried dependences into true intra-iteration dependences. Of course, the new loop boundary does not itself introduce new loop-carried dependences. Because loop-carried anti dependences and output dependences (referred to as loop-carried "false dependences") are ignored when scheduling the chaining SP code during generation 27 of the p-slices, shifting the loop boundary may expose more parallelism for chaining SP.

Another approach for reducing dependences is condition prediction 712. For clarity, condition prediction 712 is discussed herein in connection with FIGS. 7 and 11. Condition prediction involves the use of prediction techniques on certain conditional expressions in the slice. Consider, for example, the p-slice code 1104 illustrated in FIG. 11. The conditional instruction E depends on the inter-loop value generated at instruction D. That is, instruction E depends on the value of the valuable arc as determined in instruction D. In order to reduce the number of instructions in the critical sub-slice, one could predict the conditional operation at instruction E to always be true. In such case, the dependence edge between instructions D and E disappears, and instruction E can therefore be moved out of the critical sub-slice and into the non-critical sub-slice. In effect, instruction E can be performed after the spawn point once its dependence edge is eliminated via condition prediction 712. The result is higher thread-level parallelism, which may yield higher slack.

At operation 716, the multiple p-slices for the chaining SP prefetch iterations are generated in order to implement a speculative do-across prefetching loop. The p-slices contain binary code as determined and optimized during execution of blocks 706, 708, 710 and 712. One skilled in the art will recognize that loop rotation 710 and condition prediction 712 are optimizations that are not necessary to practice the method 100. Either or both optimizations may be eliminated, or may be performed in a different order than that illustrated in FIG. 7.

In addition, the p-slices generated at block 714 may also contain synchronization code. The purpose of the synchronization code is to sync up threads containing loop-carried dependences such that a thread that is relying on a value calculated in an earlier thread syncs up and communicates with the earlier thread in a timely and efficient manner. Placement of synchronization code in the p-slices for chaining SP therefore determines the level of thread-level parallelism and the synchronization overhead. For instance, if there are more than one non-degenerate SCC node in the p-slice, assuming no synchronization cost, synchronization across chaining threads after the execution of each non-degenerate SCC node may result in shorter delays across the threads than synchronizing once after all the non-degenerate SCC nodes have been executed. However, the former approach requires more instances of handshaking and the implementation of faster synchronization hardware. For one embodiment of the method 100, synchronization overhead and hardware support requirements are lessened by allowing only one point-to-point communication between threads. Accordingly, at block 714 synchronization code is added to the multiple chaining p-slices such that threads are synchronized after the non-degenerate SCC nodes have been executed. As a result, live-in values are passed at the spawn point. For at least one embodiment, the synchronization code embedded in the p-slice at block 714 provides for copying of live-in values to a buffer that is accessible by the speculative thread seeking access to the live-in value.

Figure 8:
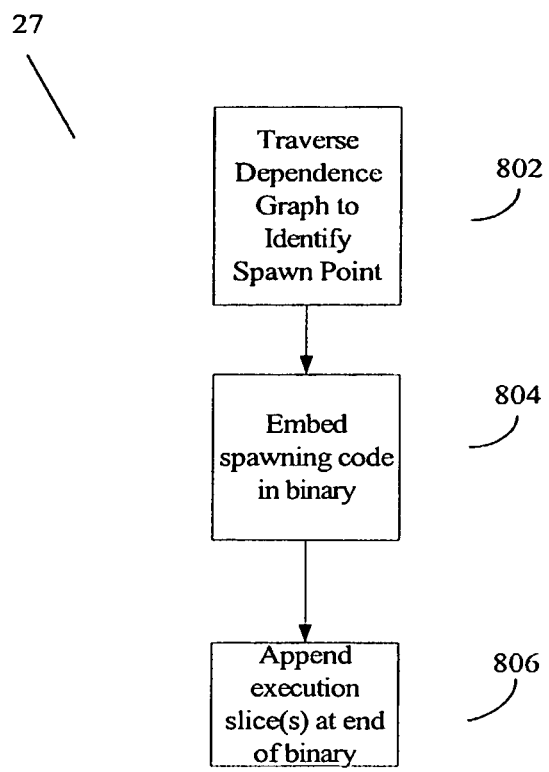
FIG. 8 is a flowchart illustrating at least one embodiment of a method for generating an enhanced binary file.

FIG. 8 illustrates generation 27 of an enhanced binary file in further detail. In general, the p-slice(s), generated as discussed above in connection with FIG. 7, are appended to the end of the main thread binary when an enhanced binary file is generated 27. One skilled in the art will recognize that the p-slice(s) may be incorporated anywhere within the main thread binary file, and need not necessarily be appended at the end of the main thread binary file. In addition, a run-time trigger is embedded in the binary file such that the p-slices will be executed at an appropriate point during execution of the main thread.

In particular, FIG. 8 illustrates that a spawning point is identified 802 as a point in the main thread where the prefetch thread(s) should be spawned. The spawn point is identified 802 by traversing the dependence graph. The method 100 seeks to locate trigger points in the main thread that would ensure enough slack while minimizing the communication between the main thread and the speculative thread(s). The trigger is embedded at the identified spawn point at block 804.

For Basic SP, a run-time event (referred to herein as a trigger) embedded 804 at the identified spawn point will cause execution of the single p-slice. No further triggers need be identified because basic SP does not provide for a speculative thread to spawn another speculative thread; basic SP uses only one speculative thread. In contrast, chaining SP requires identification of spawn points in multiple chained helper threads. Like Basic SP, embedding 804 a trigger at the identified spawn point will cause execution of the first chained p-slice. As discussed above in connection with FIG. 7, spawn points for chained threads are identified when p-slices for multiple chaining p-slices are generated 25; the scheduling considerations discussed above help to schedule chaining triggers early among multiple threads. During p-slice generation 25, a trigger is embedded in each (except the last) chaining thread at the identified spawn point (in addition to the trigger embedded in the main thread at block 804).

At block 808, the p-slice(s) are incorporated into the binary file in order to create an enhanced binary file. For at least one embodiment, the enhanced binary file includes 1) the instructions from a binary file 240 which is, for example, created by a normal compilation pass 310; as well as 2) a trigger in the main thread and 3) at least one p-slice appended at the end of the binary file. In addition, for chained SP, the enhanced binary file also includes additional p-slices for the chain iterations of the doacross loop.

In sum, a method for dynamically adapting a binary file to perform speculative precomputation has been described. An embodiment of the method is performed by a compiler, which dynamically extracts instructions leading to target operations, identifies proper spawn points, manages inter-thread communications, and generates an enhanced binary file. At least one embodiment of the method is performed as a post-compilation pass of the compiler so that it does not interfere with the normal compilation process.

In the preceding description, various aspects of dynamic post-pass generation of an enhanced binary file for software-based speculative precomputation have been described. For purposes of explanation, specific numbers, examples, systems and configurations were set forth in order to provide a more thorough understanding. However, it is apparent to one skilled in the art that the described method may be practiced without the specific details. In other instances, well-known features were omitted or simplified in order not to obscure the method.

Embodiments of the method may be implemented in hardware, software, firmware, or a combination of such implementation approaches. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the dynamic method described herein is not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 12. Sample system 1200 may be used, for example, to execute the processing for a method of dynamically generating an enhanced binary file for software-based speculative precomputation, such as the embodiments described herein. Sample system 1200 may also execute enhanced binary files generated in accordance with at least one embodiment of the methods described herein. Sample system 1200 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, set-top boxes and the like) may also be used. In one embodiment, sample system 400 may be executing a version of the WINDOWS™ operating system available from Microsoft Corporation, although other operating systems and graphical user interfaces, for example, may also be used.

Referring to FIG. 12, sample processing system 1200 includes a memory system 1202 and a processor 1204. Memory system 1202 may store instructions 1210 and data 1212 for controlling the operation of the processor 1204. For example, instructions 1210 may include a compiler program 1208 that, when executed, causes the processor 1204 to compile a program (not shown) that resides in the memory system 1202. Memory 1202 holds the program to be compiled, intermediate forms of the program, and a resulting compiled program. For at least one embodiment, the compiler program 1208 contains instructions that cause the processor 1204 to dynamically generate an enhanced binary file for the program so as to facilitate software-based speculative precomputation. For such embodiment, instructions 1210 may also include an enhanced binary file generated in accordance with at least one embodiment of the present invention.

Memory system 1202 is intended as a generalized representation of memory and may include a variety of forms of memory, such as a hard drive, CD-ROM, random access memory (RAM), dynamic random access memory (DRAM), static random access memory (SRAM) and related circuitry. Memory system 1202 may store instructions 1210 and/or data 1212 represented by data signals that may be executed by processor 1204. The instructions 1210 and/or data 1212 may include code for performing any or all of the techniques discussed herein. At least one embodiment of dynamic postpass binary enhancement for software-based speculative precomputation is related to the use of the compiler 1208 in system 1200 to cause the processor 1204 to dynamically generate an enhanced binary file as described above.

Specifically, FIGS. 1, 5, and 12 illustrate that compiler 1208 may include an identifier module 1220 that, when executed by the processor 1204, identifies 10 a delinquent instruction as described above in connection with FIGS. 1 and 5. The compiler 1208 may also include an initial slicer module 1222 that, when executed by the processor 1204, computes 20 an initial slice as described above in connection with FIGS. 1 and 6. The compiler 1208 may also include an execution slicer module that, when executed by the processor 1204, generates 25 execution slice(s) as described above in connection with FIGS. 1 and 7. Also, the compiler 1208 may include a code generator module 1226 that, when executed by the processor 1204, generates 27 an enhanced binary file as described above in connection with FIGS. 1 and 8.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. A method of compiling a software program, comprising:
identifying a delinquent memory instruction based on information in an intermediate representation of a source code, the intermediate representation generated by a compiler during initial compilation of the source code; and
modifying a main thread binary file, by a compiler without user intervention, during an additional compiler pass of the source code, to include additional instructions,
wherein the additional instructions provide for performing speculative precomputation of a memory address associated with the delinquent memory instruction, the delinquent memory instruction being an instruction in the source code.

2. The method of claim 1, wherein:
modifying the main thread binary file further comprises:
identifying a spawning point in a main thread binary file; and
embedding a trigger at the spawning point, the trigger corresponding to an execution slice.

3. The method of claim 1, wherein:
modifying the main thread binary file further comprises further comprises dynamically generating a plurality of chained execution slices, the plurality including a first chained execution slice; and
embedding a trigger at the spawning point further comprises dynamically embedding at the spawning point a trigger that corresponds to the first chained execution slice.

4. The method of claim 1, wherein modifying the main thread binary file to include additional instructions further comprises:
identifying an instruction within the main thread binary file, the identified instruction being used to calculate a memory address to be accessed by the delinquent instruction.

5. The method of claim 1, wherein modifying the main thread binary file to include additional instructions further comprises:
identifying a plurality of instructions within the main thread binary file, the identified instructions being used to calculate a memory address to be accessed by the delinquent instruction.

6. The method of claim 1, wherein modifying the main thread binary file to include additional instructions further comprises:
identifying a superset of instructions within the main thread binary file, the superset of instructions occurring within a loop of the main thread binary file, wherein the delinquent instruction occurs within the loop;
discarding an instruction of the superset, wherein the discarded instruction is not used to calculate a memory address to be accessed by the delinquent instruction; and
identifying the remaining instructions of the superset as the additional instructions.

7. The method of claim 1, wherein:
identifying a delinquent instruction further comprises identifying a delinquent instruction in a main thread binary file based on profile data.

8. An article comprising:
a non-transitory machine-readable storage medium having a plurality of machine accessible instructions, wherein, when the instructions are executed by a processor, the instructions provide for
identifying a delinquent memory instruction based on information in an intermediate representation of a source code, the intermediate representation generated by a compiler during initial compilation of the source code; and
modifying a main thread binary file, by a compiler without user intervention, during an additional compiler pass of the source code, to include additional instructions,
wherein the additional instructions provide for performing speculative precomputation of a memory address associated with the delinquent memory instruction, the delinquent memory instruction being an instruction in the source code.

9. The article of claim 8, wherein:
instructions for modifying the main thread binary file further comprise:
- identifying a spawning point in a main thread binary file; and
- embedding a trigger at the spawning point, the trigger corresponding to an execution slice.

10. The article of claim 9, wherein:
instructions for modifying the main thread binary file further comprise instructions for dynamically generating a plurality of chained execution slices, the plurality including a first chained execution slice; and
instructions for embedding a trigger at the spawning point further comprise instructions for embedding at the spawning point a trigger that corresponds to the first chained execution slice.

11. The article of claim 8, wherein instructions for modifying the main thread binary file further comprise:
- instructions for identifying an instruction within a main thread binary file, the identified instruction used to calculate a memory address to be accessed by the delinquent instruction.

12. The article of claim 8, wherein instructions for modifying the main thread binary file further comprise:
- instructions for identifying a plurality of instructions within the main thread binary file, the identified instructions used to calculate a memory address to be accessed by the delinquent instruction.

13. The article of claim 8, wherein instructions for modifying the main thread binary file further comprise:
- instructions for identifying a superset of instructions within the main thread binary file, the superset of instructions occurring within a loop of the main thread binary file, wherein the delinquent instruction occurs within the loop;
- instructions for discarding an instruction of the superset, wherein the discarded instruction is not used to calculate a memory address to be accessed by the delinquent instruction; and
- instructions for identifying the remaining instructions of the superset as the additional instructions.

14. The article of claim 8, wherein:
instructions for identifying a delinquent instruction further comprises identifying a delinquent instruction in a main thread binary file based on profile data.

* * * * *